Patented Mar. 26, 1940

2,194,684

UNITED STATES PATENT OFFICE 2,194,684

FROZEN MATERIALS

Robert Henry Bedford, New York, N. Y.

No Drawing. Application February 26, 1938, Serial No. 192,798, which is a division of application Serial No. 141,937, May 11, 1937. Divided and this application June 27, 1939, Serial No. 281,309

6 Claims. (Cl. 99—195)

This invention relates to frozen materials, such as block ice, ice-glazed frozen comestibles and containers in which frozen products may be stored or transported.

For many years comestibles, particularly flesh foods such as fish, have been frozen for the purpose of preserving such comestibles until used. Recently, the freezing of comestibles has been effected by the so-called "quick-freezing processes." In any event, when the fish are frozen, they are maintained in cold storage until used.

When frozen fish are maintained in cold storage, they are exposed to air and even at very low temperatures, for example —20° C., the rate of evaporation is comparatively so great that the fish become dry or dehydrated. As a consequence, undesirable changes in the chemical nature of the fish as well as their constituents result.

In order to inhibit evaporation directly from frozen fish under storage or other conditions, the frozen fish are dipped in water whereby an envelope or glaze of ice completely surrounding the fish is produced. When glazed fish are stored at temperatures below the freezing point of water, evaporation of water takes place from the ice glaze instead of from the fish and thus the evaporation directly from the fish together with the undesirable effects are eliminated.

The ice glaze produced from ordinary water cracks either immediately in many places or it cracks in many places after storage. Where a crack in the glaze appears, there is evaporation of water directly from the cells of that part of the fish and later from the adjacent cells. Due to the fact that the water glaze is brittle, the cracking may be increased or indeed the glaze chipped off, when the glazed fish are moved from one position to another during storage or when they are transported.

In the manufacture of ice from distilled water or raw water either by the plate or can method, the water is frozen at comparatively high temperatures. When the rate of freezing is hastened by a temperature of or slightly less than —12° C., the block ice cracks either in the can or when the can or plates are being heated for the purpose of melting out the ice from the container (see Practical Refrigerating Engineers' Pocketbook by John E. Starr, published by Ice and Refrigeration, Chicago, 1922). Cracked ice shatters when jarred and consequently cannot be handled economically.

I have now found that I can produce substantially non-cracking ice, either in the form of a block or as a glaze, from aqueous solutions containing an acid.

It is, therefore, an object of this invention to provide substantially non-cracking ice in various forms, such as in the form of block ice or as a glaze on frozen comestibles or as a glaze on containers in which the frozen comestibles are packed.

Other objects will appear from the following description and appended claims.

In accordance with the principles of the instant invention, when a flesh food such as fish is to be given an ice glaze, the fish are frozen by either a quick-freezing process or any other freezing process, and the frozen fish dipped into the glazing solution. The temperature of the glazing solution is usually at a temperature considerably higher than both the temperature of the frozen fish and the temperature of the room in which the glazing operation is performed. As a consequence, when the fish are dipped into the glazing solution and withdrawn therefrom, the glazing solution adhering to the fish, due to the temperature of the fish and the temperature of the glazing room, is substantially immediately frozen, providing a glaze completely enveloping the fish. The operation may be repeated, the number of dippings in the glazing solution depending on the thickness of the glaze desired.

The glazing solution contemplated by this invention is an aqueous solution which will produce a non-cracking ice. These results are secured by incorporating acids in the glazing solution. The acids contemplated by this invention are non-toxic and edible or used in such portions as to be non-toxic and edible. Further, in order to secure the desired properties, the acids should be soluble in water and the ice obtained from such aqueous solution should be a homogeneous solid. The acids should be of the type which have a minimum of reaction with proteins of fish (slime and skin) or the constituents of muscle cells. The acids should be substantially free of odor or taste which could be absorbed by slime, skin or muscle. Preferably, also, the acid should possess antiseptic properties whereby the bacterial growth and autolytic activity in fish are reduced. Various acids may be used. I have found the best results are secured when acids of the type and nature of hydrochloric acid of U. S. P. grade are used.

To more clearly illustrate the nature and principles of the invention, there is hereafter set forth an illustrative embodiment of the invention:

| Chemical compound | Concentration | Kind of fish | Temp. fish °C. | Temp. glazing room, °C. | Temp. glazing water, °C. |
|---|---|---|---|---|---|
| Hydrochloric acid. | pH 1.0 | Cohoe salmon. | −30 to −35 | −25 | 1 |

The concentration in the above specific illustrative embodiment is the minimum concentration for the conditions set forth. However, it is to be understood that higher concentrations may be used without departing from the spirit of this invention. Usually, however, the minimum concentration will be used for any particular set of conditions.

Now with respect to the temperature conditions in the specific example, it will be noted that the temperature of the frozen fish is between —30° C. and —35° C. and that the temperature of the glazing room is —25° C. These conditions have been selected in order to give the most economical conditions at a temperature known to be sufficiently low for all practical purposes. It is to be understood, however, that the invention is not restricted to these precise temperature conditions. If the temperature of the frozen fish to be glazed is, for example, at a higher temperature, i. e., —10° C., then the minimum concentration of the substance might and could be less than stated. If a lower temperature than —35° C. were used, then a higher concentration of the substance set forth would have to be used. The concentration for any particular set of conditions can be easily determined by simple experiment by any person skilled in the art.

Fish discolor as a result of discoloration of oils or the growth of chromogenic bacteria. Some of the causes which may bring about this are bacterial decomposition of the cell proteins, while the fish are fresh or even if the fish are frozen and stored at too high a temperature, and the leakage of ammonia fumes from the cooling coils or refrigerating system coming in contact with the frozen fish. By the use of the present invention, the rate of bacterial growth is markedly reduced or inhibited and the deleterious effect, if ammoniacal fumes come in contact with the surface of the glaze, is avoided.

Though in the illustrative embodiment Cohoe salmon is specifically referred to, it is to be understood that the invention is not restricted thereto. The principles of this invention may be applied to other varieties and species of fish and indeed to flesh food including meat, fruit and vegetables of all kinds and nature.

Glazes on comestibles, such as flesh foods, or on containers produced as aforementioned are non-cracking and smooth. The substance mentioned forms a concentrated solution when the glaze is formed which does not freeze at the storage temperatures used in practice. The hydrochloric acid solution rises by capillary action to the surface of the glaze, where it forms a film and reduces the vapor pressure characteristics of the concentration of the glazing solution. As a consequence, the commodity treated with a glazing solution of the type herein described is preserved for a longer period of time than heretofore.

The principles of the instant invention, as previously mentioned, are also applicable to the production of block ice possessing the non-cracking properties. In accordance with this phase of the invention, the selected acid is added to the water and the aqueous solution frozen according to the plate or can method. In the plate method, after freezing, the plate is heated, whereby the block ice is loosened and removed. In the can method, after freezing, the can containing the block of ice frozen therein is immersed into a solution of water at a relatively high temperature, such as 80° C.–100° C., whereby the block ice is loosened from the can and removed. The sudden heating of the plate or the sudden immersion of the can into hot water exerts a tremendous strain on the ice but, when the features of the instant invention are utilized, the ice does not crack. In order to further illustrate this phase of the invention, there is hereafter set forth an illustrative embodiment thereof:

| Chemical | Concentration | Temperature of brine for freezing |
|---|---|---|
| Hydrochloric acid | pH 1.0 | °C. −30 |

It is to be understood that the invention, with respect to the production of block ice having non-cracking characteristics, is not restricted to the specific example just given, since it is clear that different freezing temperatures may be employed.

By the use of the instant invention, non-cracking block ice is produced. In addition to possessing the properties which characterize the glaze previously described, the block ice does not crack during freezing nor during removal from the plate or can. The manufacture of non-cracking block ice at such low temperatures as herein described has the additional advantages of reducing the quantity of brine, or surface area of freezing floor space, required per ton of ice per unit of time and increasing the ice-producing capacity of the plant when such low temperatures are available.

When hydrochloric acid is employed as the acid, the ice, i. e., glaze or block ice, in addition to possessing the characteristics aforementioned, is also substantially transparent and water-white in color.

The term "edible" as used in the claims is intended to cover substances which are edible and non-toxic or used in such proportions as to be non-toxic and edible.

Since it is obvious that various changes and modifications may be made in the above description without departing from the nature or spirit thereof, this invention is not restricted thereto except as set forth in the appended claims.

This application is a division of my copending application Serial No. 192,798, filed February 26, 1938, which is itself a division of application Serial No. 141,937, filed May 11, 1937.

I claim:

1. Transparent ice formed of water containing hydrochloric acid in an amount to impart non-cracking characteristics to said ice.

2. Frozen flesh foods having a transparent ice glaze formed of water containing hydrochloric acid in an amount to impart non-cracking characteristics to said ice.

3. Frozen fish having a transparent ice glaze formed of water containing hydrochloric acid in an amount to impart non-cracking characteristics to said ice.

4. Transparent ice formed of water having a pH of approximately 1 and containing hydrochloric acid.

5. Frozen flesh foods having a transparent ice glaze formed of water having a pH of approximately 1 and containing hydrochloric acid.

6. Frozen fish having a transparent ice glaze formed of water having a pH of approximately 1 and containing hydrochloric acid.

ROBERT HENRY BEDFORD.